Dec. 5, 1944. J. T. STOKES 2,364,250
EEL KNIFE
Filed Feb. 18, 1944
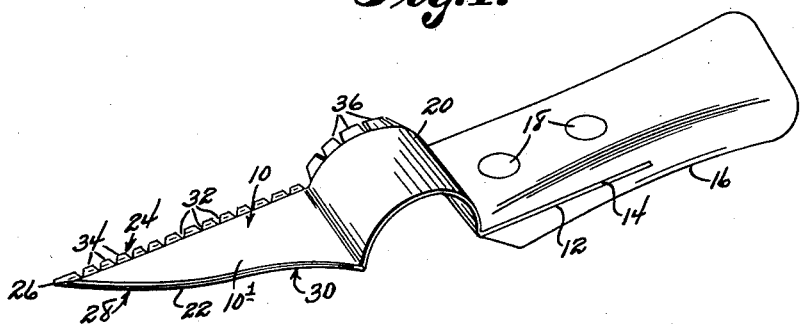
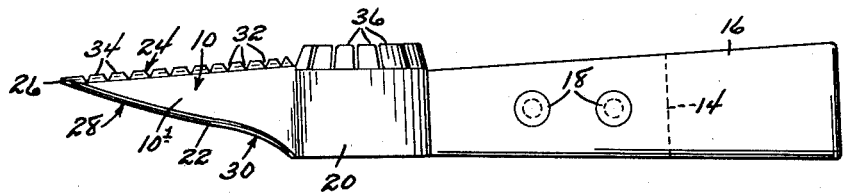
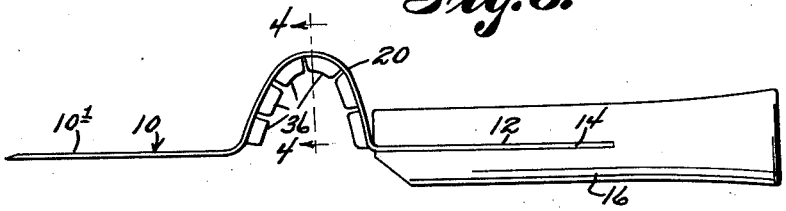
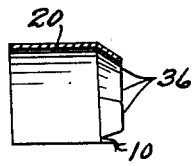
INVENTOR.
Joseph T. Stokes
BY Victor J. Evans & Co.
ATTORNEYS Patented Dec. 5, 1944

2,364,250

UNITED STATES PATENT OFFICE 2,364,250

EEL KNIFE

Joseph Thomas Stokes, Atlantic City, N. J.

Application February 18, 1944, Serial No. 522,993

1 Claim. (Cl. 30—165)

My invention relates to cutlery and has among its objects and advantages the provision of an improved eel skinning and cleaning knife.

In the accompanying drawing:

Figure 1 is a perspective view of my invention;

Figure 2 is a face view of the knife blade and its handle;

Figure 3 is an edge view of the blade and its handle; and

Figure 4 is a view taken from the position indicated by line 4—4 of Figure 1.

In the embodiment selected for illustration, I make use of a blade 10 having a flat shank 12 fitting in a slot 14 in a handle 16. The shank 14 is made secure by the usual rivets 18.

The outer flat cutting portion $10^1$ of the blade 10 preferably lies in the plane of the shank 12. The blade is also provided with a bowed formation 20 comprising a bend in the blade adjacent the end of the handle 16. One edge of the cutting portion $10^1$ of the blade 10 is provided with a cutting edge 22 arranged in generally converging relationship with respect to the straight edge 24 so as to bring the blade to a sharp point 26. Cutting edge 22 is formed with a convexed length 28 extending rearwardly from the point 26 and a concaved length 30 extending up to the bowed formation 20, the adjacent end of the cutting portion $10^1$ being of substantially the same width as the bowed formation.

Edge 24 is notched at 32 to provide gripper teeth 34 having the form of truncated cones when viewed according to Figure 2. Similar gripper teeth 36 are formed along the edge of the bowed formation 20 in alignment with the teeth 34. However, the teeth 36 project slightly beyond the teeth 34 and are inclined slightly in the direction of the axis of the bowed formation 20.

In operation, the blade 10, particularly with respect to its cutting edge 22, may be employed in the manner of an ordinary knife, as when making a longitudinal incision in the belly of the eel for cleaning purposes. For skinning purposes, the eel is cut through the bone at its throat and downwardly a short distance, at which time the meat of the eel may be grasped by the bowed formation 20 and the skin stripped therefrom. The bowed formation is located adjacent the handle 16 so that the meat of the eel may be pressed firmly into the bowed formation 20 and held firmly therein by thumb pressure. The teeth 36 secure a firm grip on the meat so that the eel may be held firmly in the bowed portion while the skin is being pulled therefrom by the other hand. Teeth 34 also perform a gripping formation analogous to the teeth 36, as when it is desirable to grip the eel with the straight run of the blade.

Without further elaboration, the foregoing will so fully illustrate my invention, that others may, by applying current knowledge, readily adapt the same for use under various conditions of service.

I claim:

An eel knife comprising a handle, a blade having a flat shank attached to one end of the handle, said blade also having a bowed portion therein adjacent the handle and lying to one side of the plane of the shank, and gripping teeth along one edge of said bowed portion and angled toward the axis of the bowed portion.

JOSEPH THOMAS STOKES.